UNITED STATES PATENT OFFICE.

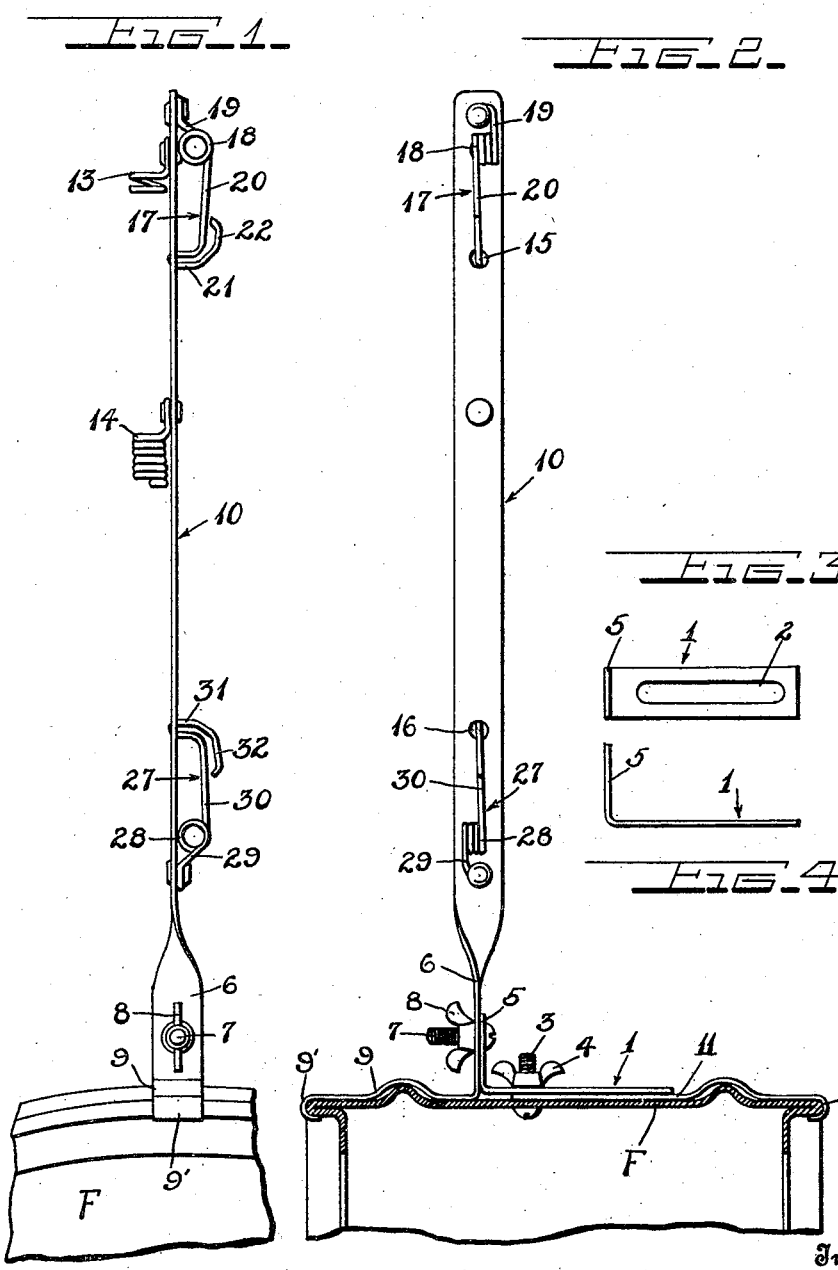

FRANK LOUNGLEY, OF OSWEGO, NEW YORK.

PENNANT-HOLDER FOR AUTOMOBILES.

1,138,964.　　　Specification of Letters Patent.　　Patented May 11, 1915.

Application filed July 20, 1914. Serial No. 852,042.

*To all whom it may concern:*

Be it known that I, FRANK LOUNGLEY, a citizen of the United States, residing at Oswego, in the county of Oswego and State of New York, have invented certain new and useful Improvements in Pennant-Holders for Automobiles; and I do declare the following to be a full, clear, and exact description of the invention, such as will enable others skilled in the art to which it appertains to make and use the same.

This invention relates to improvements in pennant holders for autos adapted to be detachably secured to an automobile fender or a like position and which may be used for securing other decorative devices in place.

The object of the invention is to provide a simply constructed and efficient holder of this character which will not vibrate and rattle, which may be readily applied to and quickly removed from an auto when desired.

With the above and other objects in view, the invention consists of certain novel features of construction, combination and arrangement of parts as will be more fully described and claimed.

In the accompanying drawings: Figure 1 represents a side elevation of an automobile fender with this improved holder applied; Fig. 2 is a cross section of the fender with the holder shown in front elevation; Fig. 3 is a plan view of the fender carried pennant attaching device detached; Fig. 4 is a side elevation thereof.

In the embodiment illustrated an automobile fender F is shown to which the pennant holder constituting this invention is applied. The holder has an attaching member comprising an L-shaped plate 1, the long arm of which is longitudinally slotted as shown at 2 to receive a securing screw 3 which passes through said slot and is preferably provided with a wing nut 4 for adjustably securing said bracket or plate 1 to the fender F, said screw preferably being passed through an aperture in said fender with the head thereof arranged on the under face of the fender and the threaded shank projecting upwardly through the slot 2 into position to receive the wing nut 4. When this bracket is in this position, the short arm 5 thereof projects upwardly at right angles to the fender in position to be clamped to the shank or stem 6 of the holder proper. This holder is here shown in the form of a flat metal strip 10 having its lower end twisted to provide the flat shank 6 which abuts against the short arm 5 of the bracket 1 and both of which are apertured to receive a fastening screw 7 preferably equipped with a wing nut 8 for connecting the holder to the bracket. Extending laterally at right angles from the lower end of this twisted shank 7 is a fender engaging arm 9. This arm 9 has an inturned hook 9' at its free end which is adapted to engage the outer edge of the fender F and assist in securely supporting the holder in position on the fender, said arm 9 extending in opposite direction to the long arm of the bracket 1 which, in connection with said bracket arm provides supporting feet or a section base for the holder. As here shown, an additional securing element is provided in the form of a plate or strip 11 having its inner end apertured to receive the fastening screw 3 and its outer end provided with an inturned hook 12 for engaging the opposite edge of the fender F as is shown clearly in Fig. 2.

The plate 10 which constitutes the body portion of the holder is provided on one face thereof with laterally spaced pole receiving sockets 13 and 14 here shown in the form of coil springs secured at one end to the plate 10 and having the bores thereof arranged parallel with the length of the plate. The socket 13 is preferably secured near the upper end of the plate or strip 10 and is here shown composed of two coils but obviously more may be employed if found necessary or desirable. The socket 14 is secured to said plate 10 at a point below and spaced from the socket 13 and is composed of a number of wire coils for the reception of the pennant or flag pole to be supported. Between the sockets 13 and 14 in the plate 10 is formed an aperture 15 and a similar aperture 16 is disposed in said plate some distance below the socket 14 for a purpose to be described.

Pole clamping elements 17 and 27 are secured to the face of the plate 10 opposite that which carries the sockets 13 and 14. Each of these elements is composed of a heavy wire coil spring 18 and 28 respectively and a securing arm 19 extends upwardly from the spring 18 and is fixed to the plate 10 by riveting or other suitable means. Extending downwardly from this spring 18 is a resilient arm 20 having a laterally extending loop 21 positioned to project through the aperture 15 in the plate 10 and to engage the pennant pole at the opposite side of the plate between the sockets 13 and 14, the spring 18 tending to force said loop through said aperture into clamping engagement with said pennant pole. The free end of this arm 20 is preferably bent upwardly and inwardly as shown at 22 to prevent its becoming entangled with the pennant or with surrounding objects.

The clamp 27 at the lower end of the plate 10 is constructed similarly to the one above described, the short arm 29 thereof extending downwardly instead of upwardly and being araranged to the plate in a manner similar to the arm 19 of the upper arm 17. The long arm 30 of this clamp 27 is provided with a laterally extending loop 31 positioned to project through the aperture 16 in the plate into clamping engagement with the lower end of the pennant pole whereby said pole is securely and yieldably held in the sockets 13 and 14 and all danger of its rattling is obviated. The terminal of the long arm 30 of the clamp 27 is bent downwardly and inwardly as shown at 32 to position it out of the way and prevent its engagement with surrounding objects.

In the use of this holder, the screw 3 is first inserted through the aperture in the fender F and in the inner end of the plate 11 and the bracket 1 is then engaged with said screw by passing the slot 2 over the threaded shank thereof and the wing nut 4 is then screwed home to firmly lock said bracket and the plate 11 to the fender, the hook 12 of said plate having been first engaged with the edge of the fender. The hook 9' of the laterally extending fender engaging the arm 9 is then hooked over the opposite edge of the fender F and the shank 6 of the plate 10 is positioned in contact with the short arm 5 of the bracket whereby the apertures in said arm and the shank are caused to register and are positioned to receive the screw 8 which is passed therethrough and then held in clamping engagement by means of the screw 7. When the parts have been so assembled, the plate or strip 10 projects upwardly from the fender F and is ready to receive the pennant or flag to be supported. When in this position, the flag pole or stick is passed downwardly through the sockets 13 and 14 and is held in proper position by the clamping engagement of the laterally extending lips or noses 21 and 31 of the clamping elements 17 and 27 which are secured to the opposite face of the plate 10 and are held in such clamping relation by means of the coil springs 18 and 20 formed thereon.

When it is desired to remove the pennant all that is necessary is to exert an upward pull on the pole thereof which readily disengages it from the sockets 13 and 14, the noses 21 and 31 moving outward under this action against the tension of their springs.

I claim as my invention:

1. A pennant holder comprising an upright supporting member, means for attaching said member to a supporting structure, spaced sockets carried by said upright member and laterally projecting clamping elements carried by said supporting member, one projecting between said sockets and the other below them.

2. A pennant holder comprising an upright supporting member, means for attaching said member, a supporting structure, longitudinally spaced sockets carried by said supporting member on one face thereof, and a resilient laterally movable clamping element extending through said supporting member between said sockets.

3. A pennant holder comprising an upright supporting member, means for attaching said member, a supporting structure, longitudinally spaced sockets carried by said supporting member on one face thereof, and a resilient laterally movable clamping element extending through said supporting member between said sockets, said clamping member comprising a coil spring having arms extending in opposite directions, one of said arms being attached to said supporting member and the other having a laterally extending loop projecting through said member between said sockets.

4. A pennant holder comprising a flat metal strip having a twisted shank at one end provided with a laterally extending supporting engaging arm, means detachably connected with said shank for coöperation with said support engaging arm for securing said strip to the supporting structure, said strip being provided with longitudinally spaced apertures above the shank thereof, pole receiving sockets positioned on one face of said strip, clamping members supported on the other face of said strip and each having a laterally extending resilient arm positioned to project through the apertures in the strip.

In testimony whereof I have hereunto set my hand in presence of two subscribing witnesses.

FRANK LOUNGLEY.

Witnesses:
L. W. BAKER,
JAMES J. MAHONEY.